United States Patent
Lean et al.

(10) Patent No.: US 9,238,185 B2
(45) Date of Patent: Jan. 19, 2016

(54) TRAPPING STRUCTURES FOR A PARTICLE SEPARATION CELL

(71) Applicant: Palo Alto Research Center Incorporated, Palo Alto, CA (US)

(72) Inventors: Meng H. Lean, Santa Clara, CA (US); Jeonggi Seo, Albany, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 14/188,018

(22) Filed: Feb. 24, 2014

(65) Prior Publication Data
US 2014/0311958 A1    Oct. 23, 2014

Related U.S. Application Data

(62) Division of application No. 11/606,457, filed on Nov. 30, 2006, now Pat. No. 8,657,120.

(51) Int. Cl.
| | |
|---|---|
| *B03B 5/00* | (2006.01) |
| *B01D 21/00* | (2006.01) |
| *B01L 3/00* | (2006.01) |
| *B03C 5/00* | (2006.01) |
| *B03C 5/02* | (2006.01) |
| *B01D 21/24* | (2006.01) |

(52) U.S. Cl.
CPC ........... *B01D 21/0042* (2013.01); *B01D 21/006* (2013.01); *B01D 21/2488* (2013.01); *B01L 3/502761* (2013.01); *B03B 5/00* (2013.01); *B03C 5/005* (2013.01); *B03C 5/028* (2013.01); *B01L 2200/0668* (2013.01); *B01L 2400/0424* (2013.01); *B01L 2400/0496* (2013.01)

(58) Field of Classification Search
USPC ........ 209/18, 143, 172.5, 173, 208, 210, 748; 210/645, 748; 137/15.18, 822
See application file for complete search history.

(56) References Cited

U.S. PATENT DOCUMENTS

| | | | | |
|---|---|---|---|---|
| 4,153,541 | A * | 5/1979 | Rumpf | B07B 7/0865 209/143 |
| 4,159,942 | A * | 7/1979 | Greer | B07B 7/08 209/1 |
| 4,383,917 | A * | 5/1983 | Wells | B04C 1/00 209/723 |
| 4,872,972 | A * | 10/1989 | Wakabayashi et al. | 209/143 |
| 5,715,946 | A * | 2/1998 | Reichenbach | B01D 21/0009 209/156 |
| 6,499,499 | B2 * | 12/2002 | Dantsker | F16K 99/0001 137/1 |
| 6,880,576 | B2 * | 4/2005 | Karp | B01F 5/0471 137/806 |
| 6,929,750 | B2 * | 8/2005 | Laurell et al. | 210/708 |
| 7,029,564 | B1 * | 4/2006 | Lock | B03C 5/028 204/547 |
| 7,077,152 | B2 * | 7/2006 | Karp | B01L 3/502784 137/15.18 |
| 7,846,382 | B2 * | 12/2010 | Strand et al. | 422/20 |
| 2004/0238052 | A1 * | 12/2004 | Karp | B01F 5/0471 137/822 |
| 2007/0029257 | A1 * | 2/2007 | Mueth | A61M 1/36 210/645 |
| 2007/0057748 | A1 | 3/2007 | Lean et al. | |
| 2008/0093306 | A1 * | 4/2008 | Oakey | B01D 57/02 210/695 |

* cited by examiner

*Primary Examiner* — Terrell Matthews
(74) *Attorney, Agent, or Firm* — Fay Sharpe LLP

(57) ABSTRACT

Trapping structures are provided for particle separation devices that make use of traveling wave fluid flow. These trapping structures are operative to capture and collect separated particles and present them for extraction. The extraction can be accomplished in conventional manners, such as through the use of suitable sized pipettes.

18 Claims, 14 Drawing Sheets

TRAPPING STRUCTURES FOR A PARTICLE SEPARATION CELL

This application is a divisional of, and claims priority to, U.S. application Ser. No. 11/606,457, filed on Nov. 30, 2006 (to issue as U.S. Pat. No. 8,657,120 on Feb. 25, 2014)), which is hereby incorporated herein by reference.

CROSS REFERENCE TO RELATED PATENTS AND APPLICATIONS

This application is related to commonly assigned U.S. application Ser. No. 11/224,347, filed on Sep. 12, 2005 (now U.S. Pat. No. 7,681,738 issued Mar. 23, 2010) and entitled "Traveling Wave Arrays, Separations Methods, and Purification Cells."

GOVERNMENT FUNDING

This invention was made with Government support under W911 NF-05-C-0075 awarded by U.S. Army. The Government has certain rights in this invention.

BACKGROUND

Particle separation and sorting represents an important requirement especially in biological and chemical processes for both macro-scale and miniaturized lab-on-chip applications. Macro-scale methods include: mechanical sieving, sedimentation, and free flow fractionation (FFF). Micro-scale methods include: hydrodynamic chromatography, size exclusion chromatography, electrophoresis, miniaturized FFF, ultracentrifugation, and ultrafiltration. These methods are extremely laborious and require skilled technicians even for routine operation.

In commonly assigned U.S. application Ser. No. 11/224,347, filed on Sep. 12, 2005 (now U.S. Pat. No. 7,681,738 issued Mar. 23, 2010) and entitled "Traveling Wave Arrays, Separations Methods, and Purification Cells", which is hereby incorporated herein by this reference, a device such as that shown in FIG. 1 is described. Such a device serves as a single-step concentration/focusing/separation device for particles that are suspended in fluid which may be configured for both batch and continuous flow operation. The combination of traveling wave grid layouts and sample separation strategies may be incorporated together with the concentration and focusing aspects of the device to provide a purification cell 600 as shown in FIG. 1. The purification cell 600 includes a concentration chamber 610, a focusing channel 650, and a separation chamber 670, 680. The top 680 of the separation chamber may be divided into a lateral row of compartments 682, 684, 686, 688, and 690 to collect an increasing range of particle sizes proceeding from left to right. For example, relatively large sized particles constitute the stream denoted by arrow 672, which are subsequently collected in compartment 690. Intermediate sized particles constitute the stream denoted by arrow 674, which are subsequently collected in compartment 688. And relatively small sized particles in stream 676 are collected in compartment 686. Streams of finer sized particles can be collected in one or both of the compartments 682 and 684. The traveling wave arrays in the separation chamber may be a continuous layout of chevrons to focus particulates in the different size ranges into the designated collection compartments at the top. The focusing section 650 forms a narrow stream which will result in improved separation performance. Representative dimensions for each portion or component of the cell 600 are provided on FIG. 1.

FIG. 2 shows another exemplary embodiment traveling wave array 700 where a connecting bridge is utilized and disposed between the top to close the loop on the cell. This strategy allows the contents of one of the collected compartments to be re-circulated to result in increased purification. The purification cell 700 includes a concentration chamber 710, a focusing channel 750, a separation chamber 770, 780, and a connecting bridge 740. The top of the separation chamber may be divided into a collection of compartments 782, 784, 786, 788, and 790 to collect an increasing range of particle sizes proceeding from left to right. For example, relatively large size particles constitute the stream denoted by arrow 772, which are subsequently collected in compartment 790. Intermediate sized particles constitute the stream denoted by arrow 774, which are subsequently collected in compartment 788. And relatively smaller sized particles in stream 776 are collected in compartment 786. Streams of finer sized particles can be collected in one or both of compartments 784 and 782. The connecting bridge 740 can be utilized to selectively return particles of a particular size or size range, to the concentration chamber 710 if further processing is desired.

This device is modular and is potentially suited for disposable use. However, the trapping functionality of the device could be improved to make trapping of appropriately sized particles more convenient and reliable. Also, improved trapping systems could be useful in a variety of implementations apart from the devices of FIGS. 1 and 2.

INCORPORATION BY REFERENCE

Commonly assigned U.S. application Ser. No. 11/224,347, filed on Sep. 12, 2005 (now U.S. Pat. No. 7,681,738 issued Mar. 23, 2010) and entitled "Traveling Wave Arrays, Separations Methods, and Purification Cells", is hereby incorporated herein by this reference.

BRIEF DESCRIPTION

In one aspect of the presently described embodiments, a device for trapping particles suspended in fluid moved through a traveling wave system comprises at least one inlet operative to receive the fluid having particles suspended therein, a first channel extending from the inlet and operative to convey the fluid received at the inlet, a collection well positioned to receive at least a portion of the fluid and the suspended particles from the first channel, a second channel parallel to the first channel, the second channel positioned to receive at least a remaining portion of the fluid and a dividing wall between the first channel and the second channel, the dividing wall being configured to allow at least the remaining portion of the fluid to flow from the first channel to the second channel.

In another aspect of the presently described embodiments, the first channel is defined by the dividing wall and a second wall, wherein the fluid and suspended particles flow in a manner so that the portion of fluid and suspended particles migrate along the second wall and avoid flow into the second channel.

In another aspect of the presently described embodiments the second wall is positioned at an angle relative to movement of the fluid as it is received at the inlet.

In another aspect of the presently described embodiments, the collection well connects to the first channel.

In another aspect of the presently described embodiments, the collection well is configured to allow removal of collected particles and flow of remaining fluid.

In another aspect of the presently described embodiments, the second channel is connected to a recirculation path for the remaining portion of the fluid.

In another aspect of the presently described embodiments, the device is positioned within an array of devices, each device being tuned to collect particles of a predetermined size.

In another aspect of the presently described embodiments, a device for trapping particles suspended in fluid moved through a traveling wave system comprises at least one inlet operative to receive the fluid having particles suspended therein, a channel extending from the inlet and operative to convey the fluid received at the inlet, the channel having at least one curve therein, the radius of curvature being such that the suspended particles collect at the least one curve as the fluid flows through the channel and at least one outlet operative to allow the fluid to flow out of the device.

In another aspect of the presently described embodiments, the channel is s-shaped.

In another aspect of the presently described embodiments, the device further comprises at least one collection well positioned to receive at least a portion of the fluid and the suspended particles from the channel.

In another aspect of the presently described embodiments, the at least one collection well is positioned at the at least one curve.

In another aspect of the presently described embodiments, the collection well is configured to allow removal of collected particles.

In another aspect of the presently described embodiments, the outlet is operative to allow the fluid to flow to a recirculation path.

In another aspect of the presently described embodiments, the device is positioned within an array of devices, each device being tuned to collect particles of a predetermined size.

In another aspect of the presently described embodiments, a device for trapping particles suspended in fluid moved through a traveling wave system comprises at least one inlet operative to receive the fluid having particles suspended therein, at least one channel extending from the inlet and operative to convey the fluid received at the inlet, the channel being configured to allow for collection of suspended particles collected as the fluid flows through the channel, and at least one outlet operative to allow the fluid to flow out of the device.

In another aspect of the presently described embodiments, the device further comprises a well operative to collect particles suspended in the fluid.

In another aspect of the presently described embodiments, the well is located along the at least one channel.

In another aspect of the presently described embodiments, the well is positioned at an end of the at least one channel opposite the inlet.

In another aspect of the presently described embodiments, the well is configured to allow removal of collected particles.

In another aspect of the presently described embodiments, the device is positioned within an array of devices, each device being tuned to collect particles of a predetermined size.

DETAILED DESCRIPTION

In accordance with the presently described embodiments, trapping structures for the above referenced separation devices are contemplated. These trapping structures are operative to capture and collect separated particles and present them for extraction. The extraction can be accomplished in conventional manners, such as through the use of suitable sized pipettes.

Figure 3:
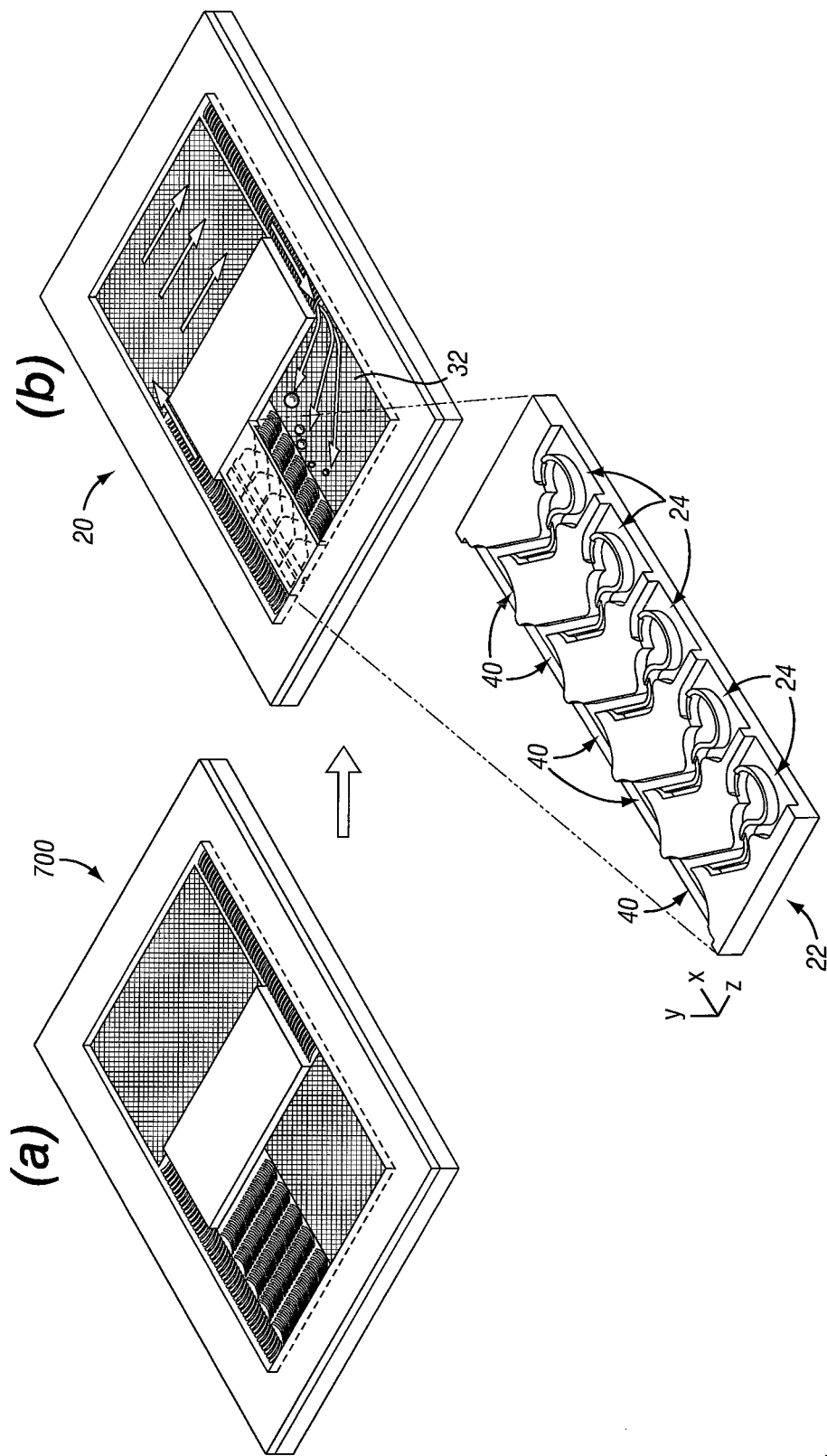
FIG. 3 is an illustration of a device incorporating the trapping structures according to the presently described embodiments.

Referring now to FIGS. 3(a) and (b), a trapping structure 22 of FIG. 3(b) is added to a separation device or cell such as the cell 700 of FIG. 3(a). In this regard, an array 22 of trapping structures 24 includes a plurality of channels 40 positioned across the width of the separation chamber 32. An objective is to capture a monotonic change in size range of particles across the chamber 32. In this perspective rendering of a 5-channel trapper structure and its location on the left side of the separation cell, arrows indicate direction of particle and fluid motion. The lower image is the trapper structure 22 shown inverted. The arrow indicates the flow direction of incoming fluid.

In one form, these structures can be formed by patterning SU-8 on bare Si substrate to form the master, casting and cross-linking PDMS using the SU-8 molds, and detaching and bonding the PDMS casts onto the surface of the TW array. Other suitable techniques may also be used.

Figure 4:
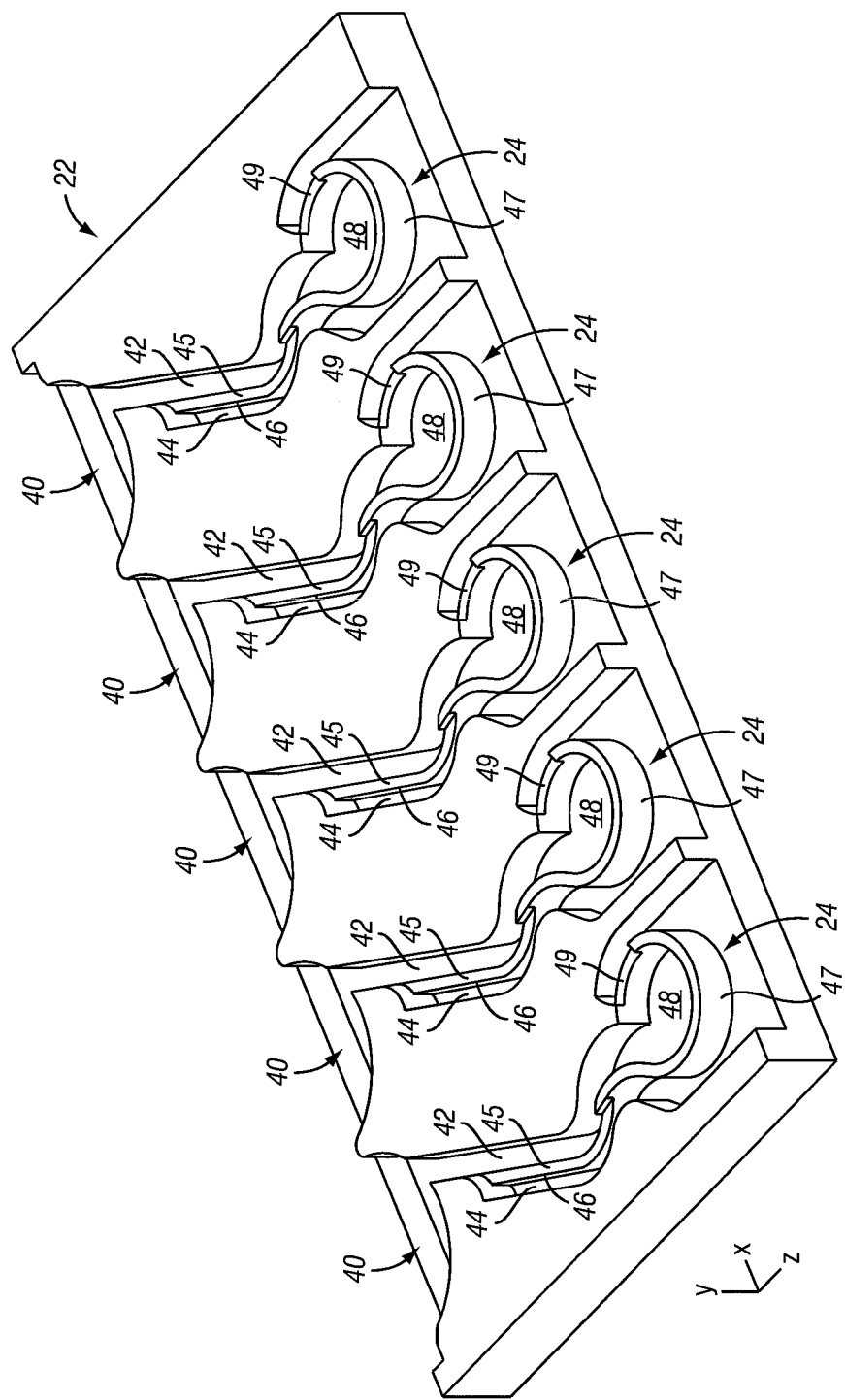
FIG. 4 is an illustration of trapping structures according to the presently described embodiments.

FIG. 4 shows a more clear view of this embodiment, a perspective view of the PDMS fabricated structure 22 showing a 5-channel trapping array. In this embodiment, each channel 40 is comprised of two smaller channels 42 and 44 with a low wall 46 separating them. Fluid seeps over the low wall while particles are retained in, for example, well area 48. The well area 48 is defined by a cylindrical wall 47 having a notch 49 provided therein for continued flow of fluid out of the well area 48.

Each channel 40, 42 and 44 is shaped and oriented to allow particles to be separated from the flow field. The shaved top or bottom portion 45 of the dividing wall 46 is to allow fluid to seep through while retaining particles as noted above.

Figure 5:
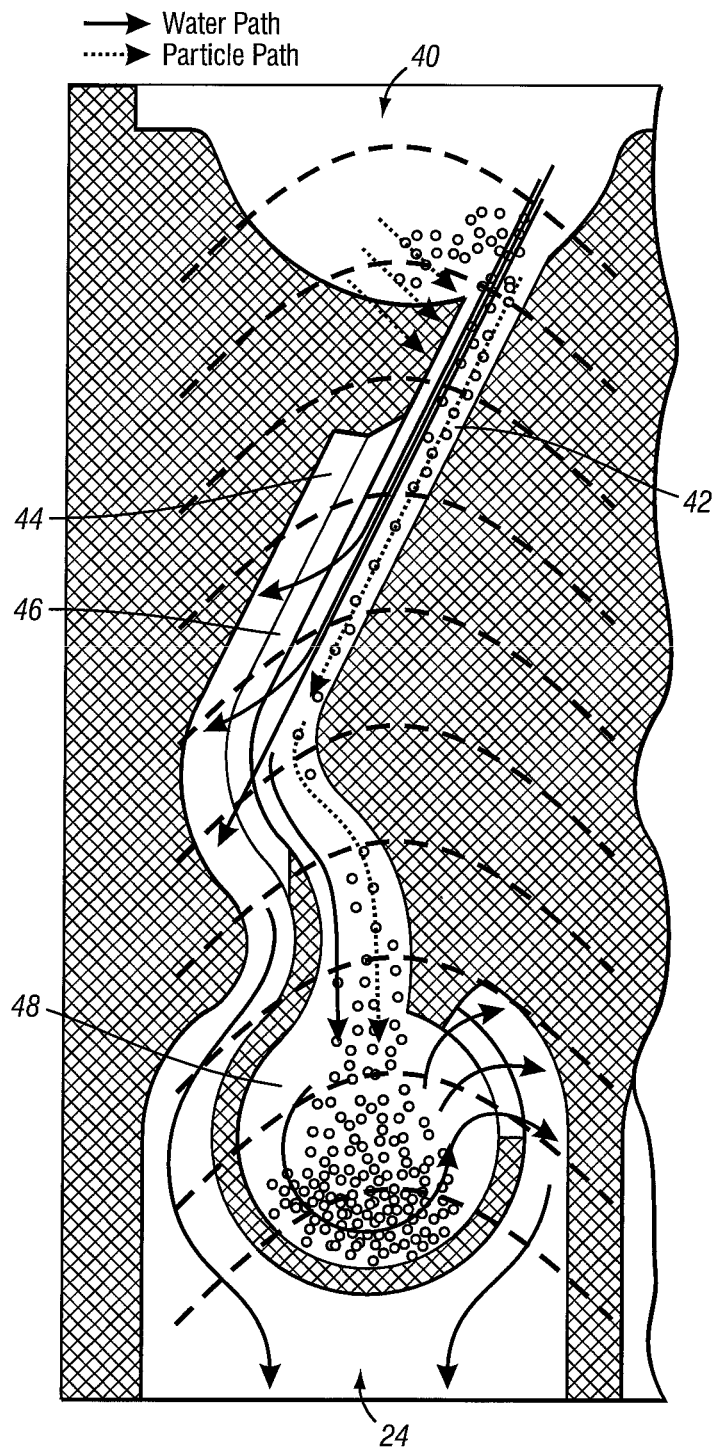
FIG. 5 is an illustration showing particle paths and fluid paths through the trapping structure of FIG. 4.

FIG. 5 shows the respective roles of the traveling curve (TW) array and fluid to further segregate particles in the trapping channel 40. As particle laden fluid enters form the top, the TW array exerts a dielectrophoresis (DEP) force on the particles pushing them towards the right wall where they stream into the right channel 42 of the two noted parallel channels. TW arrays may be chevrons as shown or rectilinear lateral aligned arrays. Fluid seeps through slit or shaved portion in the common wall 46 and proceeds to the left channel 44 for recirculation beyond the trapping channel 40. The right channel 42 enters into a collection well 48 where particles are retained and fluid is allowed to seep through the wall for other purposes, such as recirculation. This seepage may be facilitated by a suitably sized notch 49 in a wall 47 defining the well 48. As shown, the wall 47 is cylindrical in nature but may take a variety of forms. Trapped particles may be collected by an access port on the top using a syringe or a pipette. Tubing and valves may also be connected for automated extraction through the top port.

Figure 6:
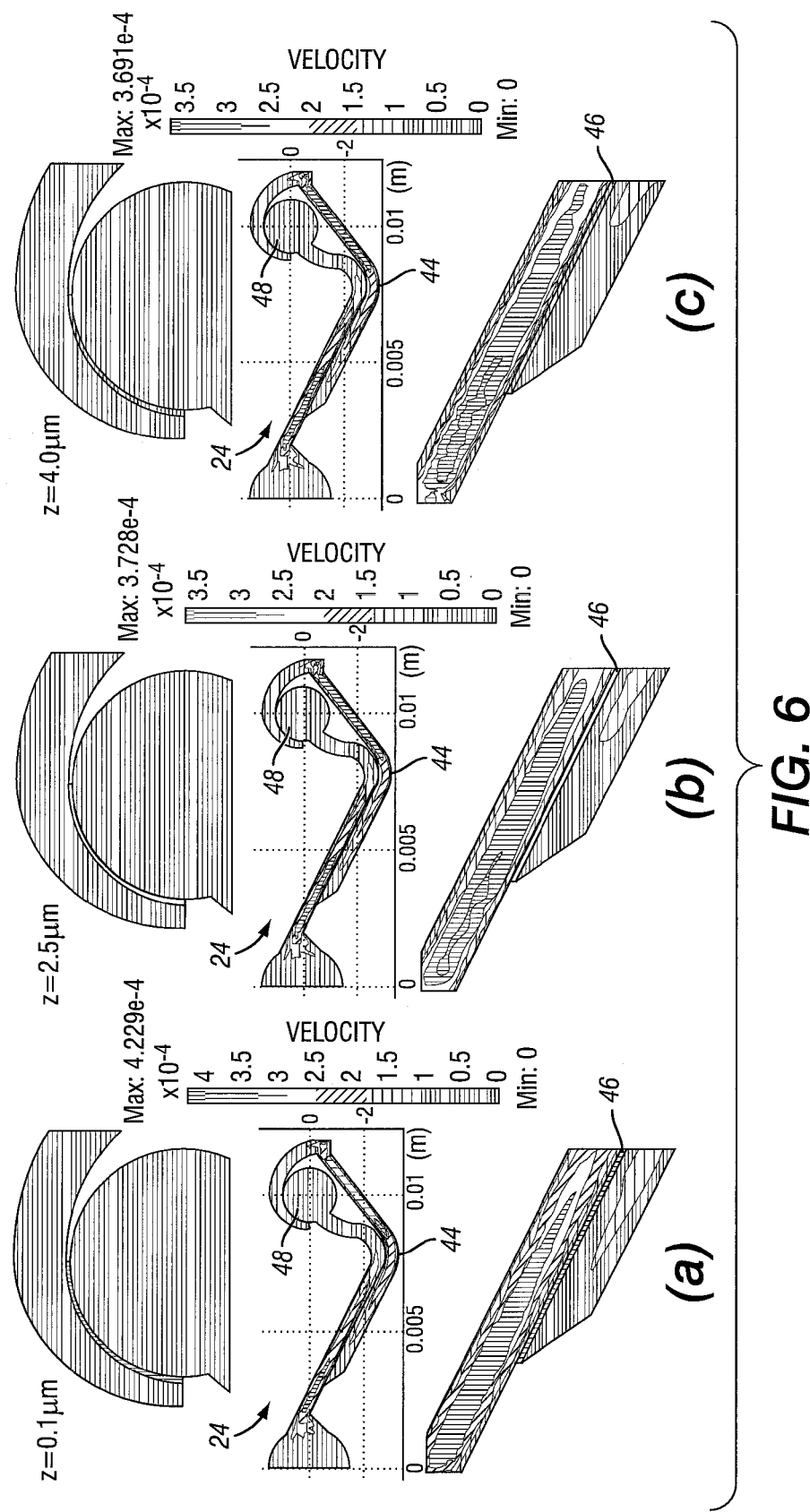
FIG. 6 is an illustration showing a velocity profile for a trapping structure according to the presently described embodiments.
Figure 7:
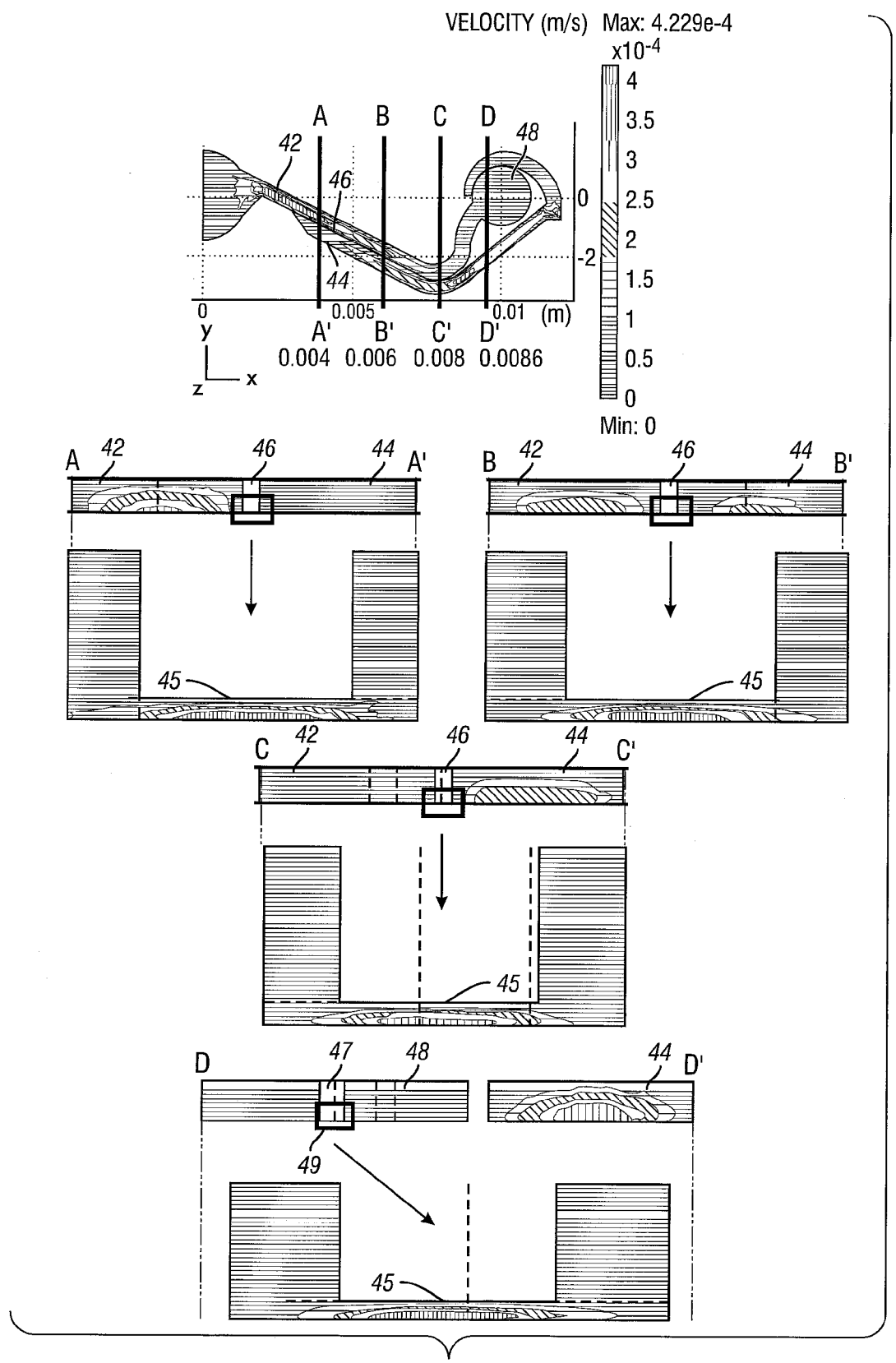
FIG. 7 is an illustration showing a velocity profile for a trapping structure according to the presently described embodiments.
Figure 8:
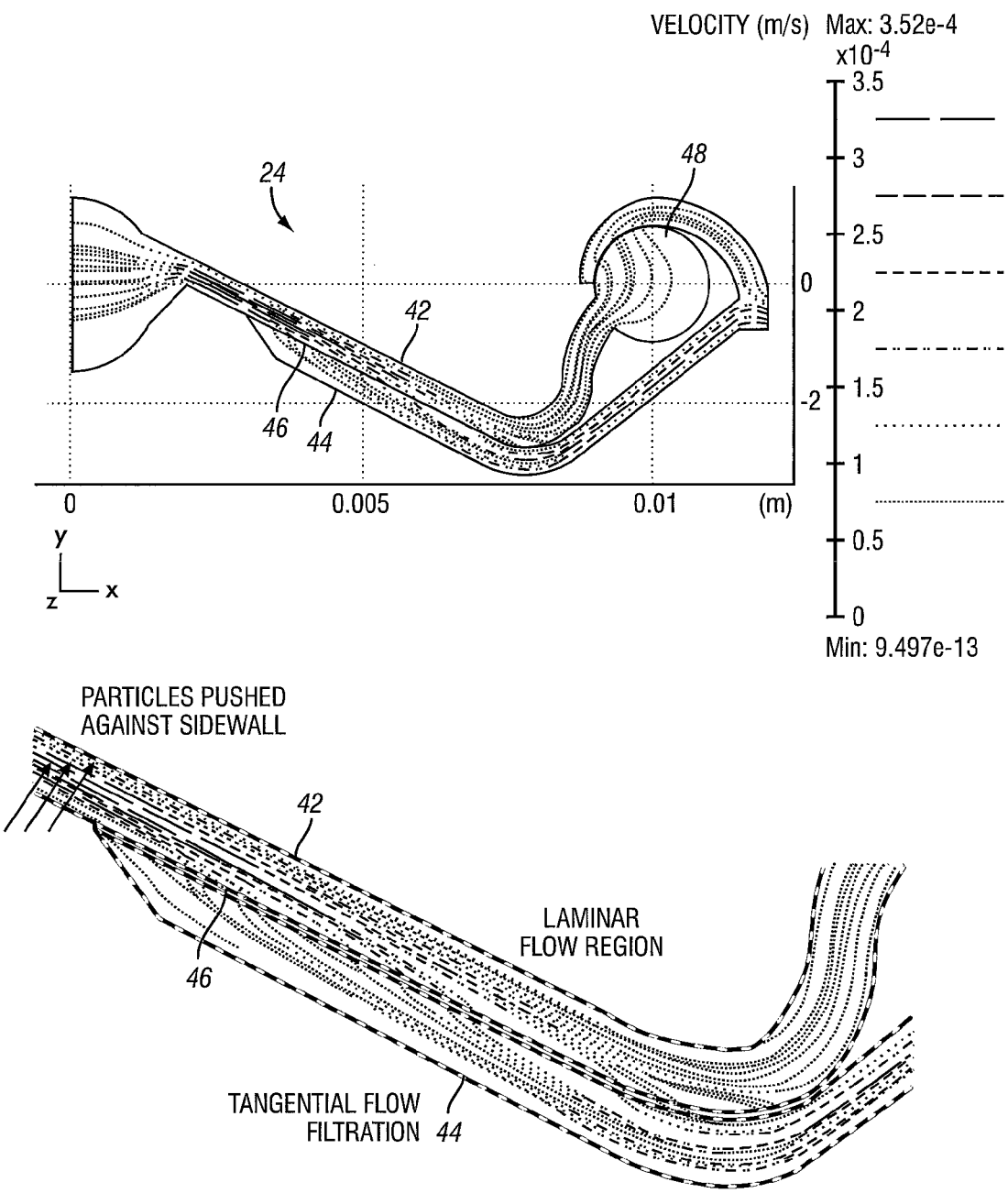
FIG. 8 is an illustration showing flow paths for a trapping structure according to the presently described embodiments.

FIGS. 6, 7, and 8 show simulations of the trapping structures. FIGS. 6(a)-(c) are top views of flow velocity in a trapping channel 40 showing the relative distributions of flow velocity. Z is a measure of the thickness of the dividing wall shaved to allow fluid seepage. In FIGS. 6(a)-(c) the values for Z are 0.1 μm, 2.5 μm and 4.9 μm, respectively. These flow distributions show that for lower values of Z, higher flow velocities are experienced by the trapping structure 24 at the point where the flow seeps over or under the dividing wall 46. These flow distributions also show that, in all cases, as the fluid approaches the collection well 48, the velocity decreases, as compared to the increasing velocity of the fluid that seeps into channel 44 toward, for example, recirculation.

In FIG. 7, successive cross-sectional views of a trapping structure 24 showing velocity distributions enhanced in the thin channel wall area between the two channels 42 and 44. Three different slit heights for the common wall 46, which are sized for the lowest range of particles, are shown. Results are for a slit or shaved portion 45 at the bottom of the dividing wall 46. The velocity distributions shown here illustrate the changes in the velocities in the channels 42 and 46. So, at cross section A, the velocity is higher in channel 42 than in channel 44, but, as the fluid progresses toward cross section B, the velocity in the channels is approximately the same. Once the fluid progresses to cross section C, the flow of velocity is greater in the channel 44 than in channel 42. Of course, the fluid in channel 42 at this point is entering the collection or well area 48, so the velocity is reduced. Also shown here is the fluid velocity as it seeps over or under the wall 46 through the shaved portion 45. The cross section D also shows the velocity of the fluid as it flows through the notched area 49 of the wall 47 defining the well area 48.

FIG. 8 shows flow streamlines along the two trapping sub-channels 42 and 44. The cross-sectional velocity distributions along the fluid paths are represented. The shift in fluid volume and corresponding change in velocity between the two parallel channels 42 and 44 is clearly evident. As such, it is apparent that higher velocities are experienced by the fluid in channel 42 as the fluid enters the trapping structure 24. However, as the particles are flowed toward collection in well area 48 and the remaining fluid seeps through the dividing wall 46, the velocity in channel 44 increases.

Figure 9:
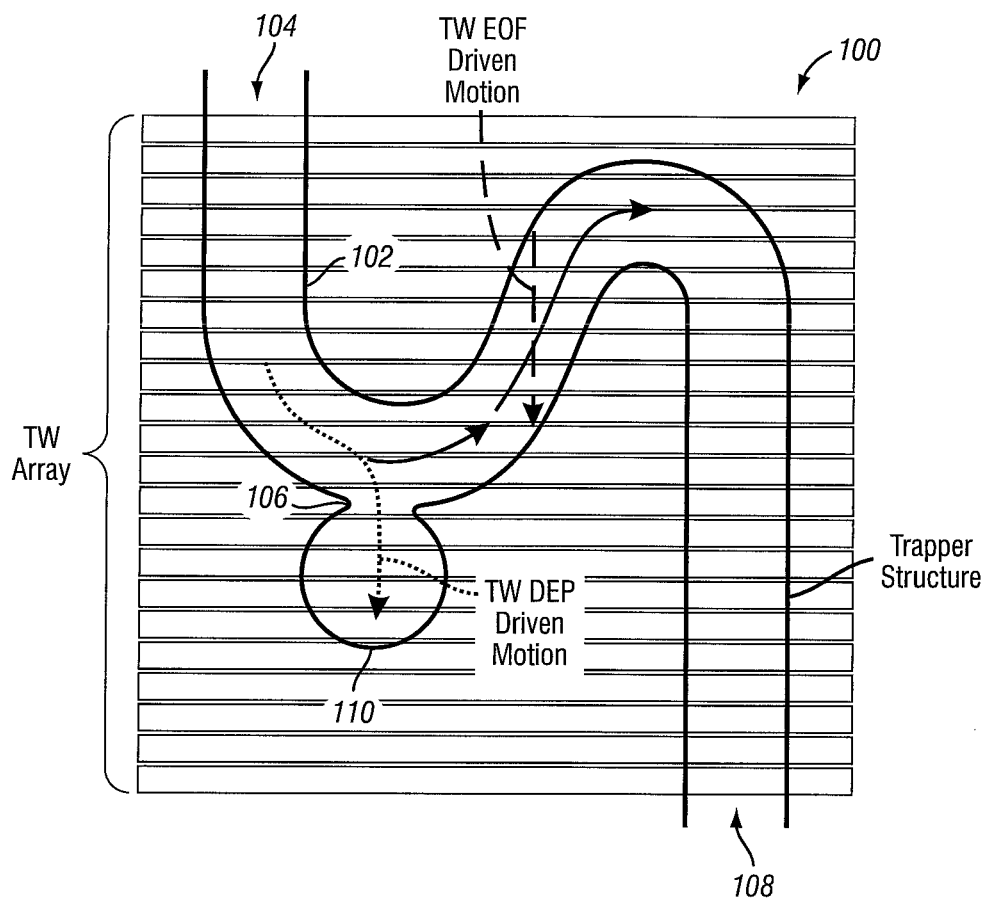
FIG. 9 is an illustration of trapping structures according to the presently described embodiments.

Another embodiment is shown in FIG. 9 where a trapping structure 100 taking the form of an S-shaped channel 102 is illustrated. The structure 100 is operative to trap particles by balancing the electro-osmotic flow (EOF) and DEP forces. At an inlet 104 to the channel 102, the EOF and DEP both act in the same direction. At the bottom 106 of the channel, the DEP forces act in opposition to the EOF and particles start to stagnate while the fluid continues to exit through an outlet 108 of the channel 102. A collection area 110 may also be defined within the vicinity of the lowest point in the channel or the curved portions to hold trapped particles, although such an area is not necessary to successfully trap particles. Without the collection area 110, particles will collect at the curved portions. The height of the channel in this case will dictate the amount of fluid that will be permitted to continue to flow through the channel. Fine tuning of the EOF is possible by pulse width modulation (PWM) of the TW waveforms. For example, reducing the width to 85% (to allow for 15% dead-time) slows the electro-kinetic pumping flow so that smaller particles may be trapped.

Figure 10:
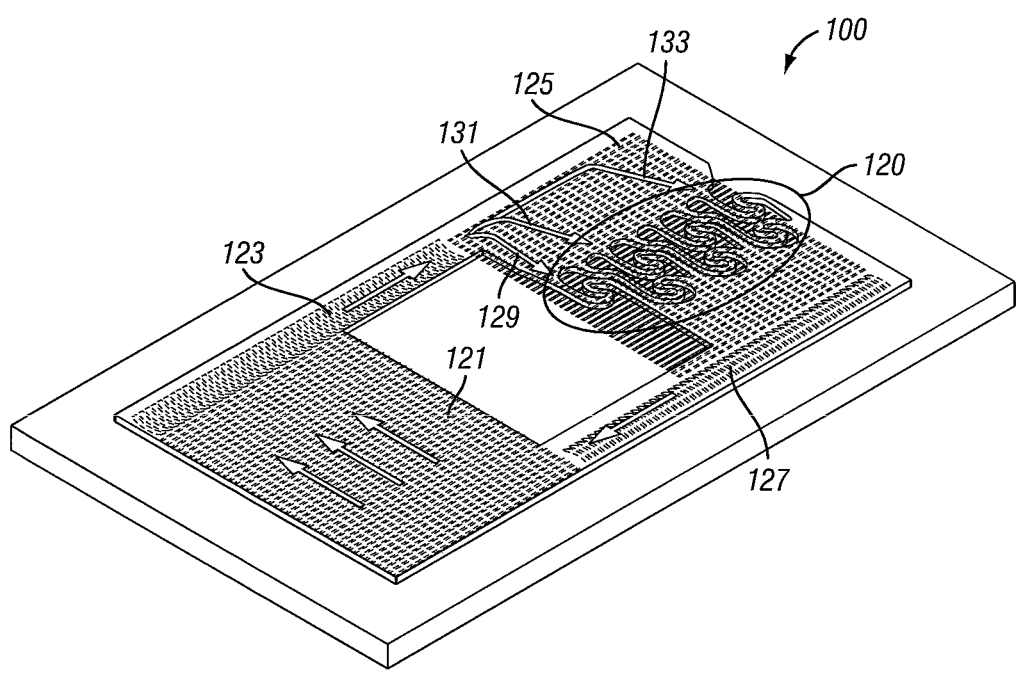
FIG. 10 is an illustration of trapping structures according to the presently described embodiments.

FIG. 10 shows a perspective view of the trapper structure 100. The trapping structure is fabricated as a two-tiered seven-channel embodiment having a trapper array 120. In this example, the channel height is 100 μm and channel width is 300 μM. The embodiment is operative for focusing, separation, trapping, and re-circulation of 1, 3 6 and 10 μm bead mixture.

Figure 1:
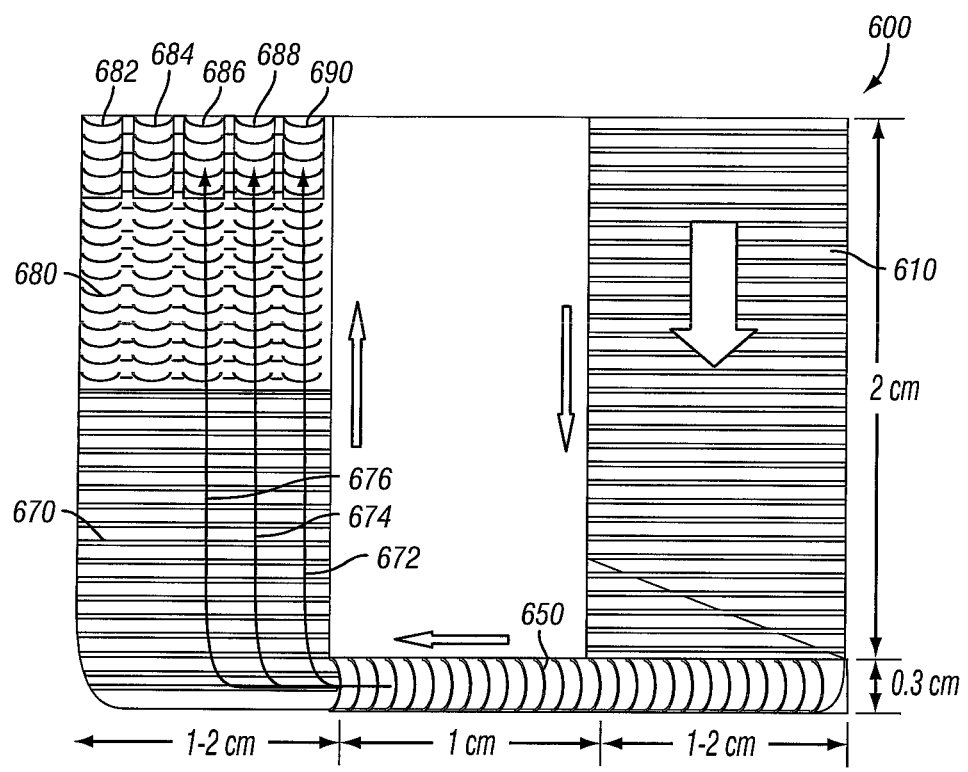
FIG. 1 is an illustration of a prior separation device.
Figure 11:
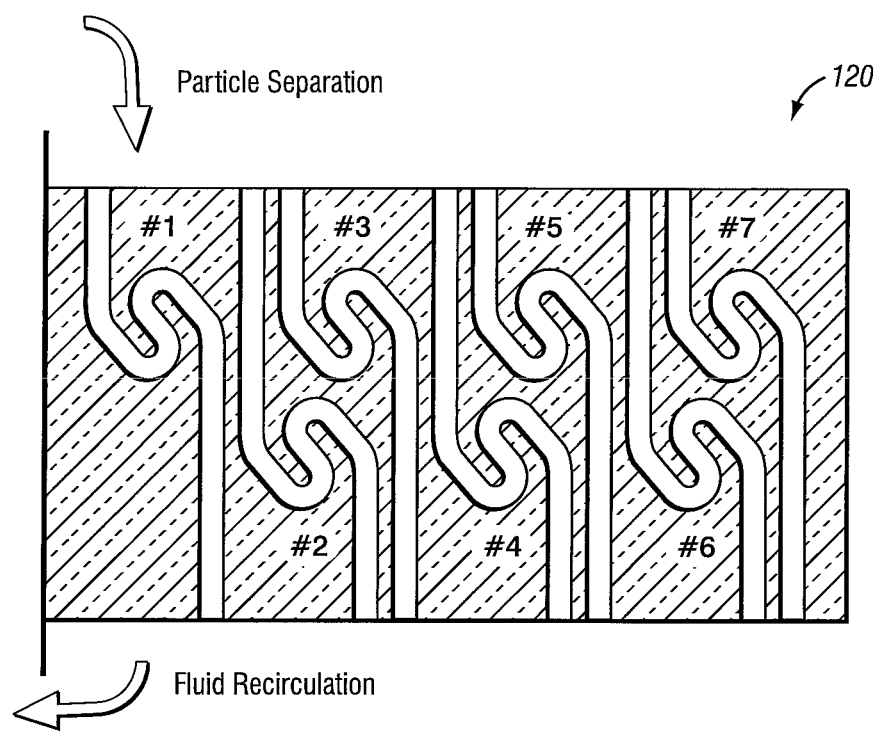
FIG. 11 is an illustration of trapping structures according to the presently described embodiments.

The layout of a 7 channel array 120 is shown in FIG. 11. Channel #1 is closest to the left wall of the separation chamber in FIG. 10 and, therefore, is designed to hold the largest particles. Referring to FIG. 10, the sample mixture is loaded through a rectangular port in a concentration chamber 121, compressed into a narrow band in the focusing channel 123, and diverged in the separation channel 125. The fluid is then routed to the trapping structure array 120 shown in FIG. 11. A 1 cm spread is observed for a 1 cm separation distance from the exit of the focusing channel. The particles will typically separate with the larger particles remaining closer to the inside as the fluid makes a turn out of the focusing channel 123. In this regard, the larger particles will follow the path of arrow 129, while progressively smaller particles will typically follow the path of arrows 131 and 133. Fluid may then be flowed into the recirculation path 127. These chambers and paths 121, 123, 125 and 127 may take forms of the corresponding elements in FIGS. 1 and/or 2. In this regard, traveling wave grids and fields may be used. For example, chevrons may be incorporated in the focusing channel 123.

Figure 12:
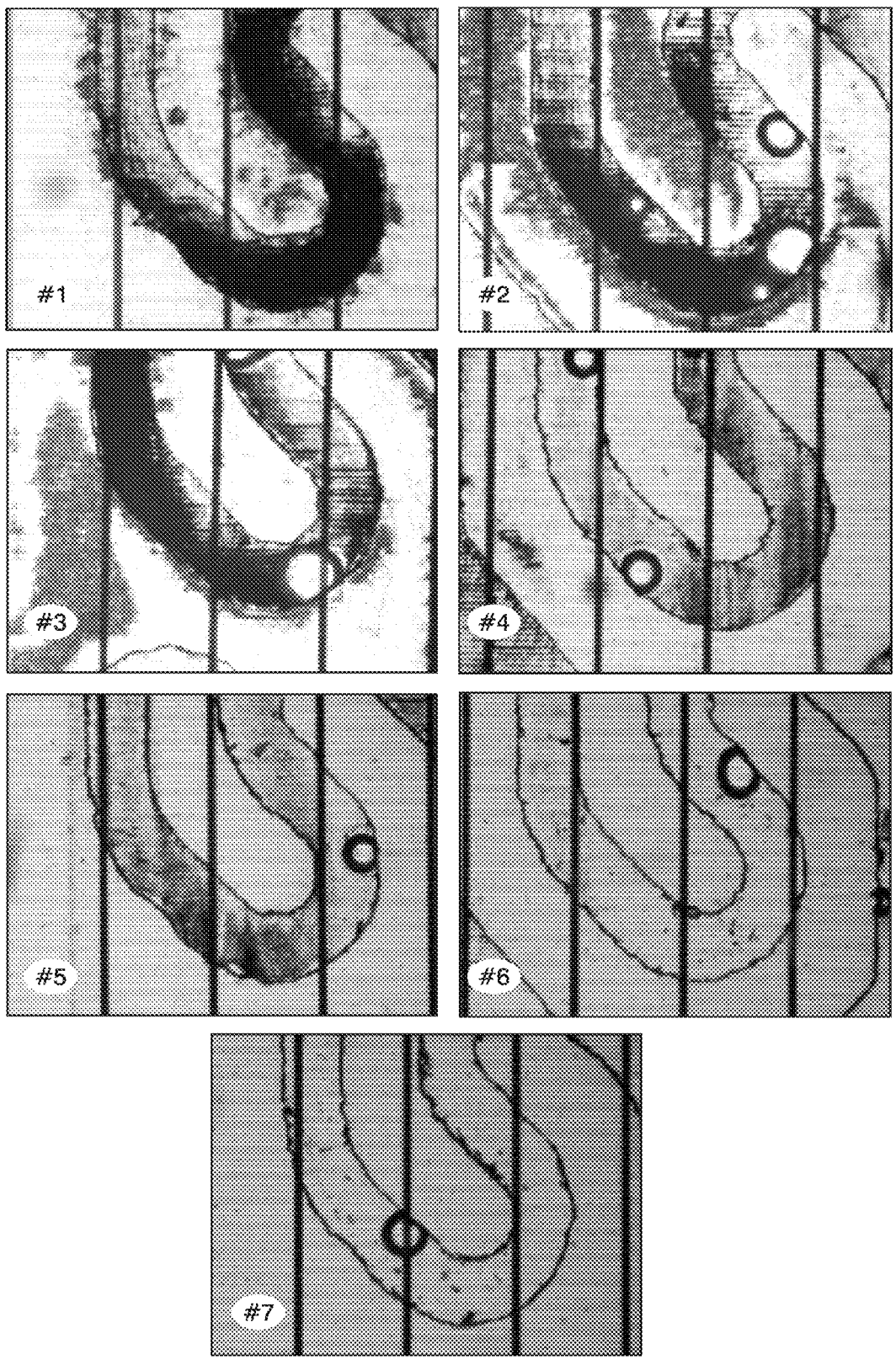
FIG. 12 is an illustration of trapping structures according to the presently described embodiments.
Figure 13:
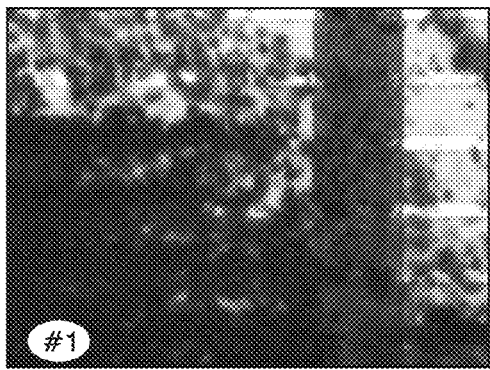
FIG. 13 is an illustration of trapping structures according to the presently described embodiments; and,
FIG. 14 is an illustration of trapping structures according to the presently described embodiments.
Figure 13:
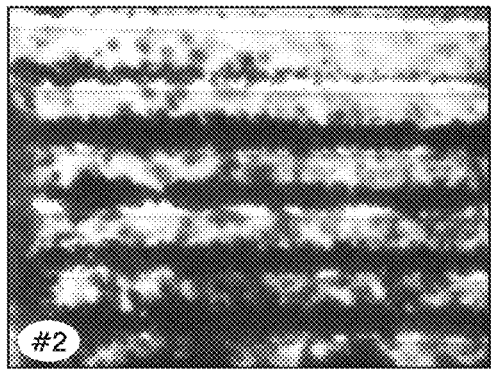
Figure 13:
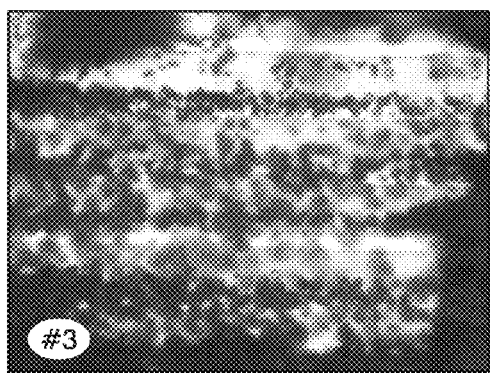
Figure 13:
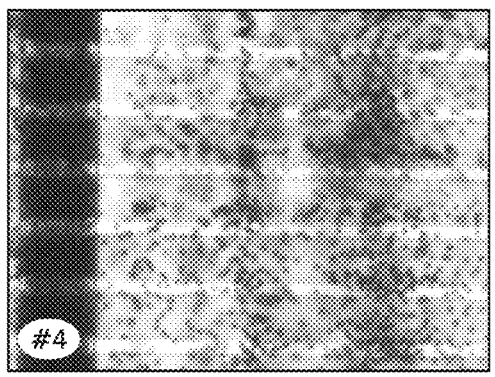
Figure 13:
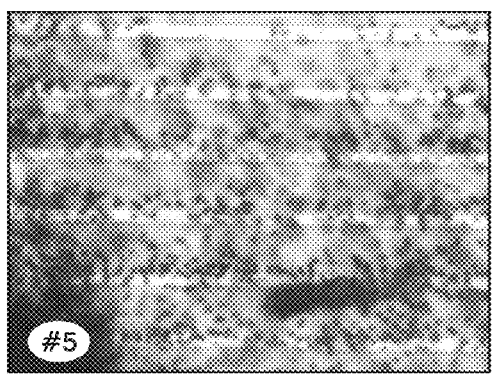
Figure 13:
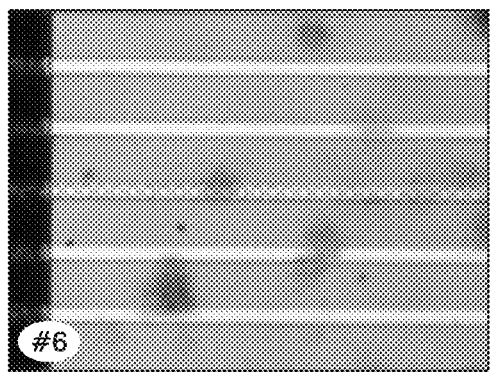
Figure 13:
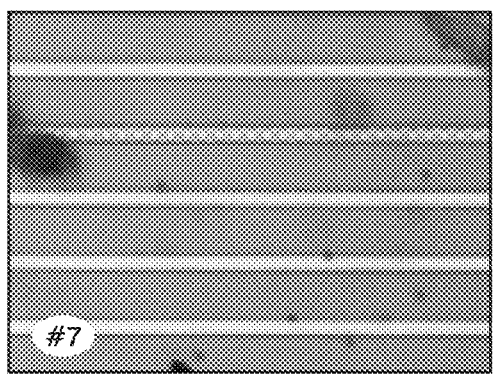
Figure 14:
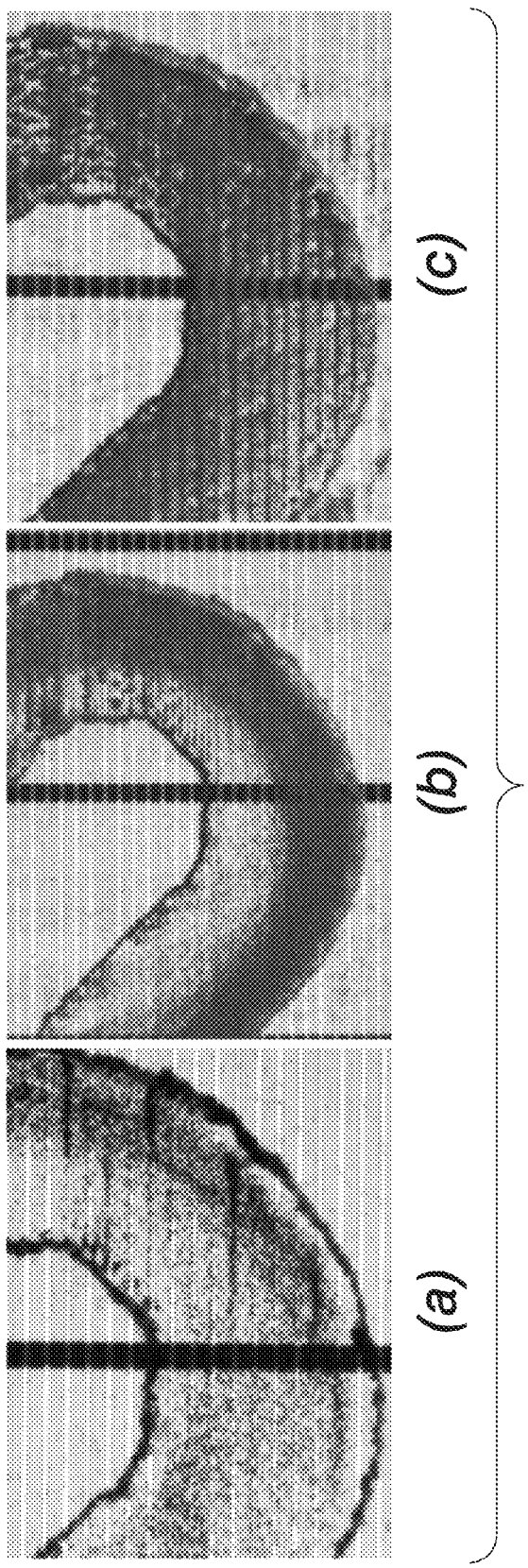

Results are shown in FIGS. 12, 13, and 14.

FIG. 12 shows a montage of the magnified views of the 7 channels. The left channel is designed to collect particles of the largest size range and so forth. So, the density of trapped particles is highest in channel #1 which is closest to the left wall and decreases as a function of distance from this wall. Channels #6 and #7 are almost devoid of particles for this range of particle size mixture. Spatial objects are microbubbles.

FIG. 13 shows higher magnification views of the 7 channels. In particular, larger beads are observed in channel #1. Average bead size is observed to decrease with increasing channel numbers.

FIG. 14 shows time-sequenced micrographs of channel #1. Near the onset of collection, particles start to stagnate at the right half of the image. As particles continue to stream in, they accumulate on the lower half of the channel. Finally, the channel is fully populated by the accumulated particles towards the end of the experiment. These particles accumulate on the surface of the TW array so fluid continues to flow in the upper elevation of the channel.

Figure 2:
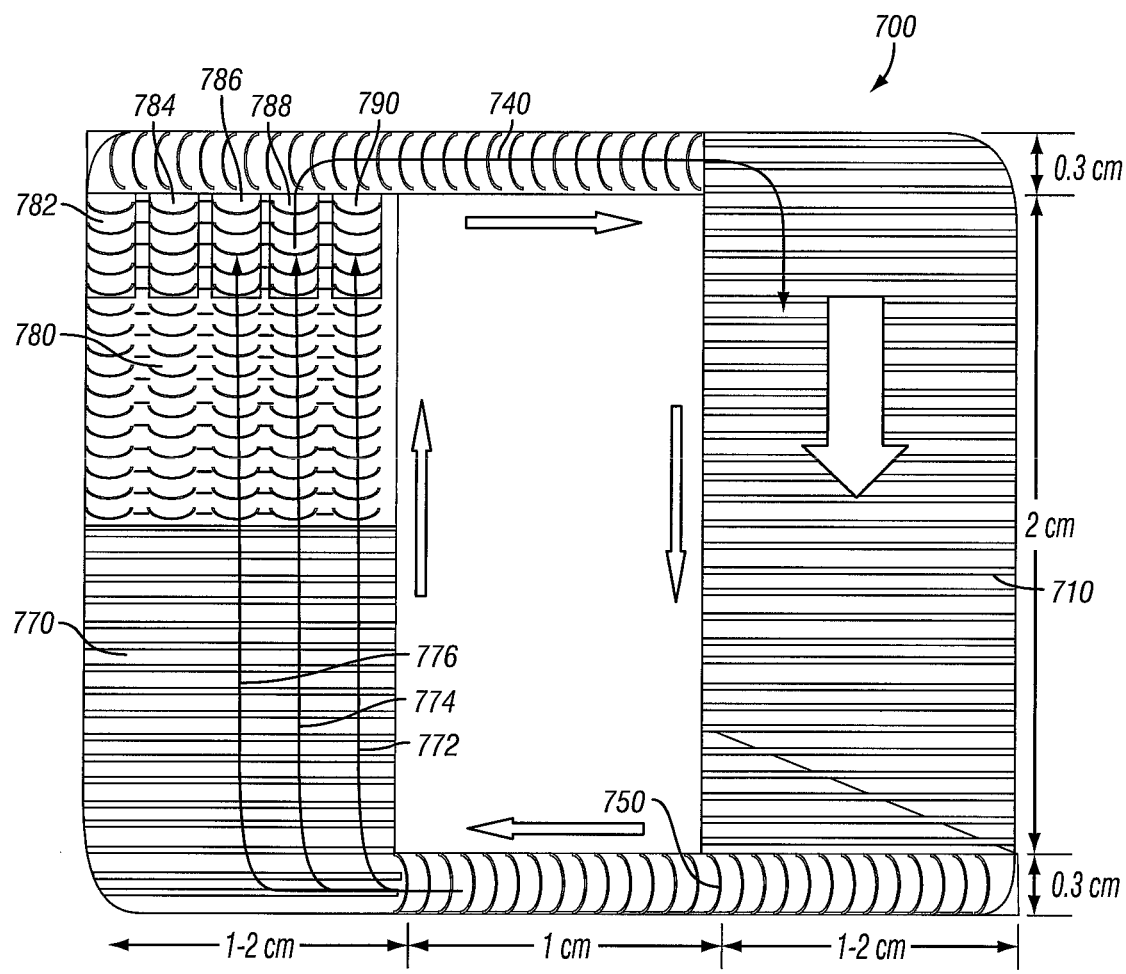
FIG. 2 is an illustration of a prior separation device.

The trapping structure contemplated herein may be placed in a variety of different environments to collect particles. However, if the trapping structure is used with systems described in, for example, FIGS. 1, 2 and 10, the system may be tuned for better performance and separation resolution.

Parameters that may be modified to optimize performance include: (1) increasing curvature of any chevrons in the focusing channel focusing grid to result in a narrower compressed plume as the particles exit the focusing channel and migrate toward the trapping structures; (2) narrower or tapered chevron focusing channel (e.g., channel 123) so that mixture of particles originate from the same location; (3) thinner fluid layer to keep particles closer to the influence of the TW field; (4) suitable vertical compression field to move particles closer to the TW grid provided on the system for better control but not to retard operation; (5) reposition the corner as the particles exit, for example, the focusing channel 123 with respect to narrow part of particle plume so that separated streams do not run into them; (6) pulse width modulation (PWM) of TW to reduce and balance EOF against DEP for particle trapping as noted above; and (7) selecting an optimal number of collection chambers and their locations by design considerations of the fluidic dimensions, particle size range, and flow velocity.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A device for trapping particles suspended in fluid moved through a traveling wave system, the device comprising:
   at least one inlet operative to receive the fluid having particles suspended therein;
   a channel extending from the inlet and operative to convey the fluid received at the inlet, the channel having at least one curve therein, the radius of curvature being such that the suspended particles collect and are collected at the at least one curve as the fluid flows through the channel; and,
   at least one outlet operative to allow the fluid to flow out of the device.

2. The device as set forth in claim 1 wherein the channel is s-shaped.

3. The device as set forth in claim 1 further comprising at least one collection well positioned to receive at least a portion of the fluid and the suspended particles from the channel.

4. The device as set forth in claim 3 wherein the at least one collection well is positioned at the at least one curve.

5. The device as set forth in claim 3 wherein the collection well is configured to allow removal of collected particles.

6. The device as set forth in claim 1 wherein the outlet is operative to allow the fluid to flow to a recirculation path.

7. The device as set forth in claim 1 wherein the device is positioned within an array of devices, each device being tuned to collect particles of a predetermined size.

8. A device for trapping particles suspended in fluid moved through a traveling wave system, the device comprising:
   at least one inlet operative to receive the fluid having particles suspended therein;
   at least one channel extending from the inlet and operative to convey the fluid received at the inlet, the channel being curved to allow for collection of suspended particles in a curved portion as the fluid flows through the channel; and,
   at least one outlet operative to allow the fluid to flow out of the device.

9. The device as set forth in claim 8 further comprising a well operative to collect particles suspended in the fluid.

10. The device as set forth in claim 9 wherein the well is located along the at least one channel.

11. The device as set forth in claim 9 wherein the well is positioned at an end of the at least one channel opposite the inlet.

12. The device as set forth in claim 9 wherein the well is configured to allow removal of collected particles.

13. The device as set forth in claim 8 wherein the device is positioned within an array of devices, each device being tuned to collect particles of a predetermined size.

14. A device for trapping particles suspended in fluid moved through a traveling wave system, the device comprising:
   at least one inlet operative to receive the fluid having particles suspended therein;
   a first channel extending from the inlet and operative to convey the fluid received at the inlet;
   a collection well positioned to receive at least a portion of the fluid and the suspended particles from the first channel;
   a second channel parallel to the first channel, the second channel positioned to receive at least a remaining portion of the fluid;
   a dividing wall between the first channel and the second channel, the dividing wall being configured to allow at least the remaining portion of the fluid to flow over the dividing wall from the first channel to the second channel and,
   a recirculation path for the second fluid connected to the second channel.

15. A device for trapping particles suspended in fluid moved through a traveling wave system, the device comprising:
   at least one inlet operative to receive the fluid having particles suspended therein;
   a channel extending from the inlet and operative to convey the fluid received at the inlet, the channel having at least one curve therein, the radius of curvature being such that the suspended particles collect and are collected at the at least one curve as the fluid flows through the channel; and,
   at least one outlet operative to allow the fluid to flow out of the device to a recirculation path.

16. A device for trapping particles suspended in fluid moved through a traveling wave system, the device comprising:
   at least one inlet operative to receive the fluid having particles suspended therein;
   at least one channel extending from the inlet and operative to convey the fluid received at the inlet, the channel being curved to allow for collection of suspended particles in a curved portion as the fluid flows through the channel; and,
   at least one outlet operative to allow the fluid to flow out of the device to a recirculation path.

17. A device for trapping particles suspended in fluid moved through a traveling wave system, the device comprising:
   at least one inlet operative to receive the fluid having particles suspended therein;
   a channel extending from the inlet and operative to convey the fluid received at the inlet, the channel having at least one curve with a well positioned therein, the radius of curvature being such that the suspended particles collect and are collected in the well at the at least one curve as the fluid flows through the channel; and, at least one outlet operative to allow the fluid to flow out of the device.

18. A device for trapping particles suspended in fluid moved through a traveling wave system, the device comprising:
- at least one inlet operative to receive the fluid having particles suspended therein;
- at least one channel extending from the inlet and operative to convey the fluid received at the inlet, the channel being curved with a well to allow for collection of suspended particles in the well as the fluid flows through the channel; and,
- at least one outlet operative to allow the fluid to flow out of the device.

* * * * *